(No Model.)
B. G. HUDNUT.
CORN PRODUCT.
No. 430,289. Patented June 17, 1890.
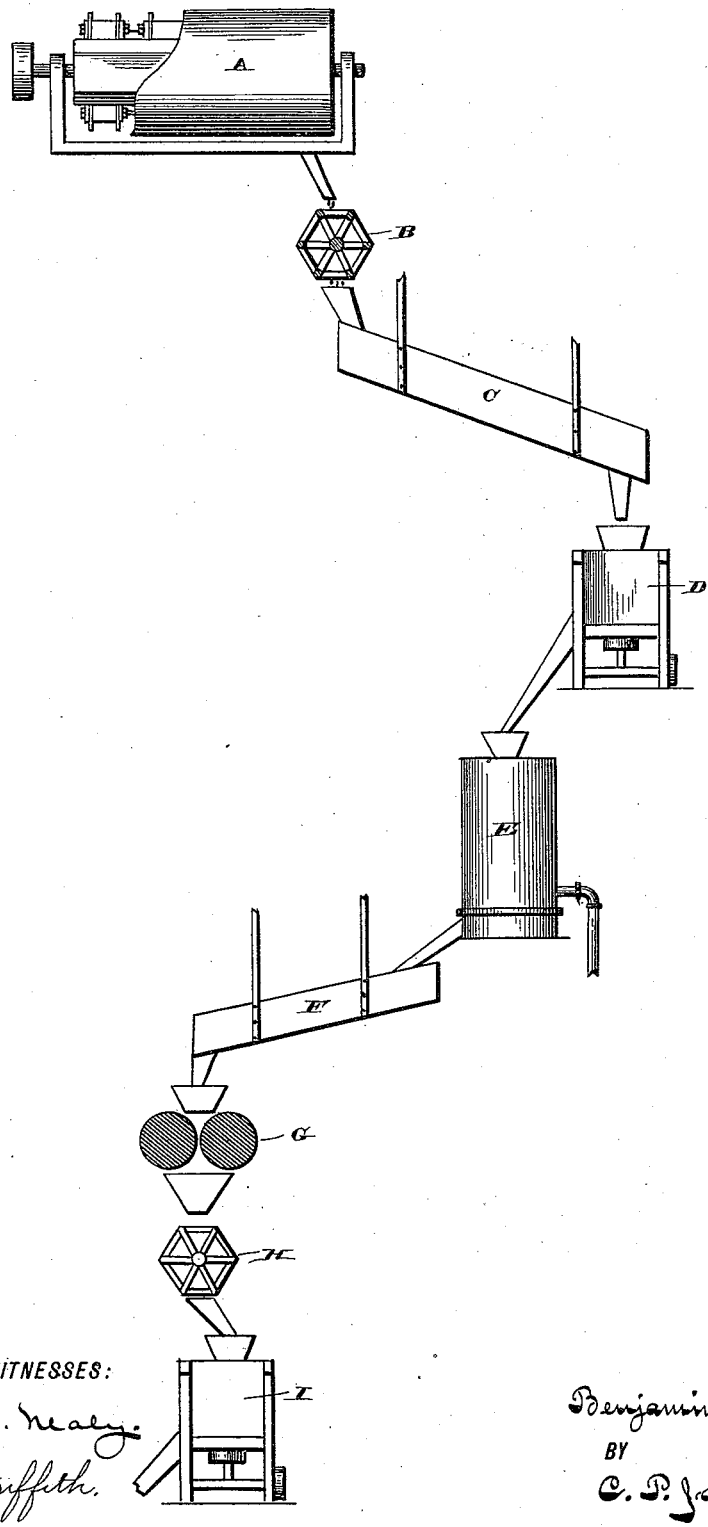
WITNESSES:
INVENTOR
Benjamin G. Hudnut
BY
C. P. Jacobs.
ATTORNEY.

UNITED STATES PATENT OFFICE.

BENJAMIN G. HUDNUT, OF TERRE HAUTE, INDIANA.

CORN PRODUCT.

SPECIFICATION forming part of Letters Patent No. 430,289, dated June 17, 1890.

Application filed April 5, 1890. Serial No. 346,775. (No specimens.)

*To all whom it may concern:*

Be it known that I, BENJAMIN G. HUDNUT, of Terre Haute, county of Vigo, and State of Indiana, have invented certain new and useful Improvements in Corn Products; and I do hereby declare that the following is a full, clear, and exact description thereof, reference being had to the accompanying drawings, in which like letters refer to like parts.

My invention relates to the manufacture of certain new corn products, which I term steamed or cooked hominy, grits, and meal, and which can be used either as food products or for brewing purposes.

The drawing represents a diagram of the several machines used in the process of manufacture. My process for making them is substantially as follows: The raw corn is first passed through a hominy-mill or degerminating-machine A and is made into hominy, and thence to a reel or grader B to separate the offal, and from thence it is passed to a drier C. Then after cleaning and scouring the hominy in an ordinary machine D, it is passed through any steaming or heating process commonly known. The machine, however, which I chiefly use is a vessel E, two or three feet in diameter (more or less) and four to six feet high, (more or less,) into the top of which the hominy as above prepared passes, coming out at the bottom. Steam is injected into this vessel at a proper temperature, thus steaming and cooking the hominy to some extent, and the material is then passed to some suitable machine F for drying the same. At this stage of manufacture the material may be used for food and is quickly prepared for the table; but in adapting it to the purpose of brewing it is taken from the drier and passed to reduction-rolls G, and then properly graded and cleaned by machines H and I; and it may then be mixed directly with malt for the brewer's use. Heretofore in using corn products of this class the brewer has found it necessary to treat the material separately before mixing it with the malt, but with material made by my process this separate treatment is no longer necessary.

I do not herein claim the several steps of the process above described, either in making corn into hominy, or of steaming or drying the hominy, or of grinding and grading the same, as they are separately old; but What I do claim as my invention, and desire to secure by Letters Patent, is the following:

1. The corn product made from hominy, screened, partly cooked by steam, dried, flattened in rolls, and then graded and cleaned, substantially as shown and described.

2. The process of treating corn in the manufacture of hominy, grits, or meal, which consists in first making it into hominy, then grading and drying the same and partly cooking it by steam, then drying and passing through reduction-rolls, and then grading and cleaning the material, substantially as shown and described.

In witness whereof I have hereunto set my hand this 28th day of March, 1890.

BENJAMIN G. HUDNUT.

Witnesses:
C. P. JACOBS,
E. B. GRIFFITH.